Sept. 22, 1925.
W. R. PRILIPP ET AL
1,554,520
RADIUS ROD CONNECTION
Filed Aug. 19, 1924
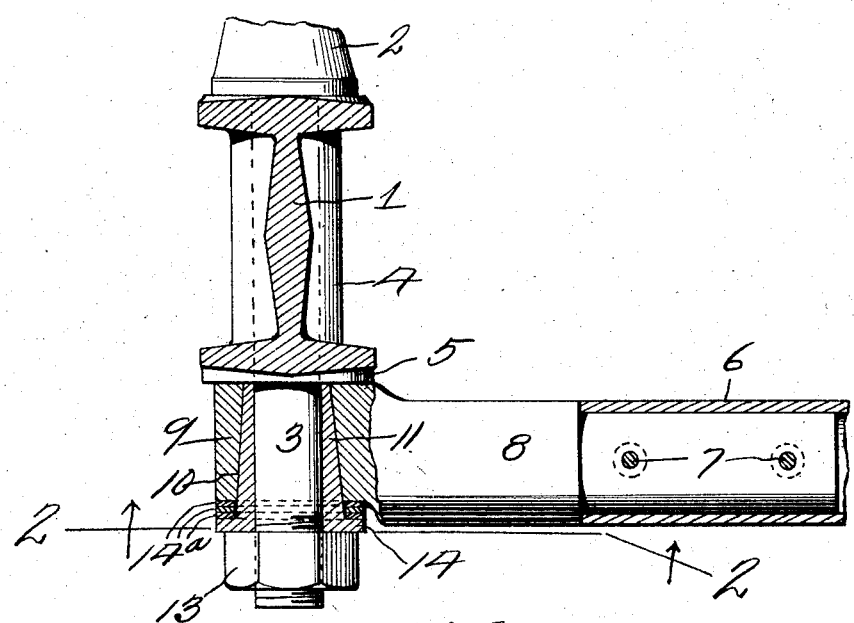
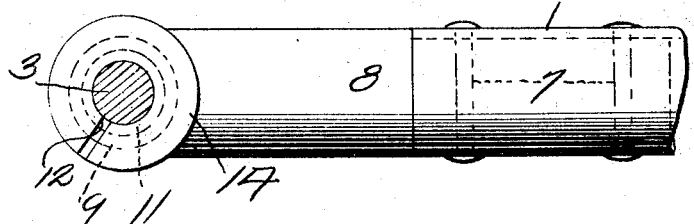
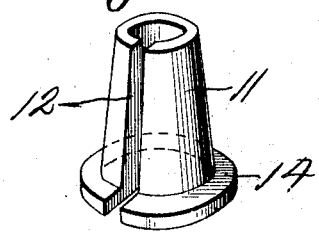
Inventors
W. R. Prilipp
J. T. Griggs
By D. Swift
Attorney Patented Sept. 22, 1925.

1,554,520

UNITED STATES PATENT OFFICE.

WILLIAM R. PRILIPP, OF MESERVEY, AND JAY T. GRIGGS, OF GOODELL, IOWA.

RADIUS-ROD CONNECTION.

Application filed August 19, 1924. Serial No. 733,001.

*To all whom it may concern:*

Be it known that we, WILLIAM R. PRILIPP and JAY T. GRIGGS, citizens of the United States, residing at Meservey and Goodell, in the counties of Cerro Gordo and Hancock, State of Iowa, have invented a new and useful Radius-Rod Connection; and we do hereby declare the following to be a full, clear, and exact description of the invention, such as will enable others skilled in the art to which it appertains to make and use the same.

The invention relates to radius rod connections and has for its object to provide a device of this character wherein there is a relatively long bearing connection between the forward end of the radius rod and the shank of the perch which extends through the axle of the automobile, thereby obviating the rapid enlargement of the bearing and consequent rattle and play.

A further object is to provide a tapered bearing sleeve extending through the end of the radius rod and by means of which bearing sleeves play may be taken up from time to time as the bearing wears. Also to provide a plurality of washers which may be removed from time to time as the bearing wears, and as the tapered sleeve is tightened and cut off on its reduced end.

A further object is to provide the tapered sleeve with a split, which split allows the sleeve to contract when tightened, and the enlarged end of the sleeve with an annular flange with which the perch shank nut engages and between which flange and the radius rod the removable washers are disposed.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a vertical sectional view through a conventional form of axle and the tapered bearing connection of the radius rod.

Figure 2 is a horizontal sectional view taken on line 2—2 of Figure 1.

Figure 3 is a perspective view of the tapered bearing sleeve.

Referring to the drawing, the numeral 1 designates a conventional form of automobile axle, and 2 a conventional form of spring perch, the shank 3 of which extends vertically through the enlarged portion 4 of the axle and the integral boss 5 carried by the under side of the axle. Heretofore radius rods have had their forward ends flattened and provided with a relatively short bearing connection with the spring perch shank 3, however it has been found that incident to strain bearings of the above character soon become enlarged, and consequently the axle 1 is not only not properly braced but rattle develops which is extremely objectionable. To obviate this difficulty the forward end 6 of the radius rod has secured thereto by means of rivets 7 an extension 8, and which extension at its forward end is provided with a relatively long vertically disposed bearing sleeve 9 having a tapered chamber 10 therein. The shank 3 of the spring perch 2 extends axially through the tapered chamber 10, and through the tapered bearing sleeve 11, the outer tapered wall of which is tapered at substantially the same angle as the chamber 10, and is adapted to have a frictional binding engagement therewith, when the tapered sleeve 11, which is split at 12, is forced inwardly. Threaded on the lower end of the shank 3 is a nut 13, which nut when tightened against the lower end of the split sleeve 11 forces said sleeve inwardly. The lower end of the sleeve 11 is provided with an annular flange 14, and between which flange and the under side of the sleeve 9 are interposed washers 14, which washers are adapted to be removed, one at a time, as play develops incident to wear in the tapered chamber 9 or the split sleeve 11, therefore it will be seen that when a washer is removed the split sleeve 11 can be further forced into the tapered chamber 10, however as a washer is removed a portion of the small end of the split sleeve 11 is cut off, preferably filed therefrom, and consequently the sleeve will be shortened to allow the same to enter the tapered chamber 10 the distance of the thickness of the washer 14 which has been removed.

From the above it will be seen that a radius rod connection is provided, which forms a relatively large bearing, and at the same time one which may be easily and quickly adjusted for taking up play in the bearing and connection, thereby insuring a positive bracing of the axle, and one wherein play and rattle therein may be easily and quickly eliminated.

The invention having been set forth what is claimed as new and useful is:—

The combination with the forward end of an automobile radius rod, the shank of a spring perch, said shank extending downwardly through an axle and terminating at a point below the under side of the axle, of a connection between said radius rod and said shank, said connection comprising a vertically disposed sleeve carried by the radius rod and surrounding the shank and having an upwardly tapered chamber therein, a tapered split sleeve extending upwardly through the tapered chamber in the first mentioned sleeve, said tapered sleeve surrounding the shank a flange carried by the lower end of the tapered sleeve, a plurality of washers interposed between said flange and the lower end of the first mentioned sleeve, and a nut threaded on the lower end of the shank and cooperating with the tapered sleeve for holding the said tapered sleeve in frictional engagement with the tapered chamber of the first mentioned sleeve and the shank of the perch.

In testimony whereof we have signed our names to this specification.

WILLIAM R. PRILIPP.
JAY T. GRIGGS.